United States Patent
Phan et al.

(10) Patent No.: US 11,270,221 B2
(45) Date of Patent: Mar. 8, 2022

(54) UNSUPERVISED CLUSTERING IN QUANTUM FEATURE SPACES USING QUANTUM SIMILARITY MATRICES

(71) Applicant: INTERNATIONAL BUSINESS MACHINES CORPORATION, Armonk, NY (US)

(72) Inventors: Anna T. Phan, Brighton (AU); Don Greenberg, Teaneck, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 432 days.

(21) Appl. No.: 16/456,421

(22) Filed: Jun. 28, 2019

(65) Prior Publication Data

US 2020/0410380 A1 Dec. 31, 2020

(51) Int. Cl.
*G06N 10/00* (2019.01)
*B82Y 10/00* (2011.01)
*G06F 15/80* (2006.01)
*G06K 9/62* (2022.01)

(52) U.S. Cl.
CPC ............ *G06N 10/00* (2019.01); *B82Y 10/00* (2013.01); *G06F 15/803* (2013.01); *G06K 9/6215* (2013.01); *G06K 9/6218* (2013.01)

(58) Field of Classification Search
CPC ........ G16C 10/00; G16C 20/20; G16C 20/10; G06F 17/11; G06N 10/00
See application file for complete search history.

(56) References Cited

U.S. PATENT DOCUMENTS

| | | |
|---|---|---|
| 7,653,646 B2 | 1/2010 | Horn et al. |
| 8,266,121 B2 | 9/2012 | Roitblat et al. |
| (Continued) | | |

FOREIGN PATENT DOCUMENTS

| | | |
|---|---|---|
| CN | 108595532 A | 9/2018 |
| WO | 2015085190 A2 | 6/2015 |

OTHER PUBLICATIONS

Mendelson et al., "Quantum-Assisted Clustering Algorithms for NISQ-Era Devices", Jun. 27, 2019, pp. 1-12. XP055732001.
(Continued)

*Primary Examiner* — Robert G Bachner
(74) *Attorney, Agent, or Firm* — Henry J. Daley; Venable LLP

(57) ABSTRACT

A method of performing unsupervised clustering of data points includes determining a number of qubits to include in a quantum processor based on feature dimensions of each data point. The method includes, for each pair of data points, executing a quantum circuit on a quantum processor having the determined number of qubits. The quantum circuit includes a feature map template circuit parameterized with a first plurality of rotations, a backward feature map template circuit parameterized with a second plurality of rotations, and a measurement circuit that outputs a similarity measure. The method includes creating a similarity matrix based on the similarity measure for each pair of data points, and inputting the similarity matrix to a classical clustering algorithm to cluster the data points. The feature map template circuit and the backward feature map template circuit each use quantum properties of superposition and entanglement of the qubits of the quantum processor.

24 Claims, 5 Drawing Sheets

(56) References Cited

U.S. PATENT DOCUMENTS 8,533,848 B2    9/2013   Jin et al.
10,169,445 B2   1/2019   Weinstein et al.

OTHER PUBLICATIONS

Aïmeur et al., "Quantum Speed-Up for Unsupervised Learning", Machine Learning, Kluwer Academic Publishers—Plenum Publishers, NE, vol. 90, No. 2, Aug. 31, 2012, pp. 261-287, XP035163790.
Chakraborty et al., "Design and Analysis of a Quantum Circuit to Cluster a Set of Data Points", Advances in Signal Processing, Jan. 1, 2016, pp. 7-12, XP055732006.
Otterbach et al., "Unsupervised Machine Learning on a Hybrid Quantum Computer" arxiv.org, Cornell University Library, Dec. 15, 2017, XP080846539.
Khan et al., "K-Means Clustering on Noisy Intermediate Scale Quantum Computers", arxiv.org, Cornell University Library, Sep. 26, 2019, XP081483748.
PCT/EP2020/067867 International Search Report dated Oct. 1, 2020.
PCT/EP2020/067867 Written Opinion dated Oct. 1, 2020.
Havlicek et al. "Supervised learning with quantum enhanced feature spaces," arXiv:1804.11326v2 [quant-ph] Jun. 5, 2018, pp. 1-22.
Kandala et al. "Hardware efficient Variational Quantum Eigensolver for Small Molecules and Quantum Magnets," arXiv:1704.05018v2 [quant-ph] Oct. 13, 2017, pp. 1-24.
Li et al. "Quantum-Inspired Evolutionary Clustering Algorithm Based on Manifold Distance." In Proceedings of the first ACM/SIGEVO Summit on Genetic and Evolutionary Computation, pp. 871-874. ACM, 2009.
Brockmeier et al. "Quantifying the Informativeness of Similarity Measurements." Journal of Machine Learning Research 18 (2017) 1-61.

```
500                                             502
┌─────────┴─────────┐                    ┌────────┴────────┐
{'fowlkes_mallows': {                    {'fowlkes_mallows': {
    'agglomerative': 1.0,                    'agglomerative': 1.0,
    'dbscan': 1.0,                           'dbscan': 0.9527288741779099,
    'spectral': 1.0,                         'spectral': 1.0},
    'linear': 0.5012820346378706,        'mutual_information': {
    'poly': 0.5132970465340556,              'agglomerative': 1.0,
    'rbf': 0.514543515491527,                'dbscan': 0.9000255541566701,
    'sigmoid': 0.6670544013596935},          'spectral': 1.0},
'mutual_information': {                  'rand_index': {
    'agglomerative': 1.0,                    'agglomerative': 1.0,
    'dbscan': 1.0,                           'dbscan': 0.908740854832499,
    'spectral': 1.0,                         'spectral': 1.0}}
    'linear': 0.016519301688412587,
    'poly': 0.03686512411517677,
    'rbf': 0.03712591679424087,
    'sigmoid': 0.0},
'rand_index': {
    'agglomerative': 1.0,
    'dbscan': 1.0,
    'linear': 0.010094859633380393,
    'poly': 0.03846123027860353,
    'rbf': 0.03852286293456403,
    'sigmoid': -0.002410861565791031,
    'spectral': 1.0}}
```

FIG. 5 ary_matrices.

UNSUPERVISED CLUSTERING IN QUANTUM FEATURE SPACES USING QUANTUM SIMILARITY MATRICES

BACKGROUND

The present invention relates to unsupervised clustering, and more specifically, to unsupervised clustering in quantum feature spaces using quantum similarity matrices.

Unsupervised learning is a critical component of many big data workflows, especially in pharmaceuticals and biosciences. When data contains massive numbers of measured data, often labeling is impossible at scale, and clustering is relied on to process the data into interpretable groups.

SUMMARY

According to an embodiment of the present invention, a method of performing unsupervised clustering of a plurality of data points includes determining a number of qubits to include in a quantum processor based on a number of feature dimensions of each of the plurality of data points. The method includes, for each pair of data points of the plurality of data points, executing a quantum circuit on a quantum processor having the determined number of qubits. The quantum circuit includes a feature map template circuit parameterized with a first plurality of rotations, wherein the first plurality of rotations are based on feature values of a first data point of the pair of data points. The quantum circuit further includes a backward feature map template circuit parameterized with a second plurality of rotations, wherein the second plurality of rotations are based on feature values of a second data point of the pair of data points. The quantum circuit further includes a measurement circuit that outputs a similarity measure for the pair of data points. The method includes creating a similarity matrix for the plurality of data points based on the similarity measure for each pair of data points, and inputting the similarity matrix to a classical clustering algorithm to cluster the plurality of data points. The feature map template circuit and the backward feature map template circuit each use quantum properties of superposition and entanglement of the qubits of the quantum processor.

According to an embodiment of the present invention, a hybrid quantum-classical system includes a quantum processor. The quantum processor has a number of qubits corresponding to a number of feature dimensions of each data point of a plurality of data points to be clustered. The quantum processor is configured to, for each pair of data points of the plurality of data points, execute a quantum circuit. The quantum circuit includes a feature map template circuit parameterized with a first plurality of rotations, wherein the first plurality of rotations are based on feature values of a first data point of the pair of data points. The quantum circuit includes a backward feature map template circuit parameterized with a second plurality of rotations, wherein the second plurality of rotations are based on feature values of a second data point of the pair of data points. The quantum circuit includes a measurement circuit that outputs a similarity measure for the pair of data points. The feature map template circuit and the backward feature map template circuit each use quantum properties of superposition and entanglement of the qubits of the quantum processor. The hybrid quantum-classical system includes a classical processor in communication with the quantum processor. The classical processor is configured to receive the similarity measure for each pair of the plurality of data points, create a similarity matrix for the plurality of data points based on the similarity measure for each pair of data points, and execute a classical clustering algorithm on the similarity matrix to cluster the plurality of data points.

BRIEF DESCRIPTION OF THE DRAWINGS

FIG. 5 shows simulated and experimental results for a data set.

DETAILED DESCRIPTION

Figure 1:
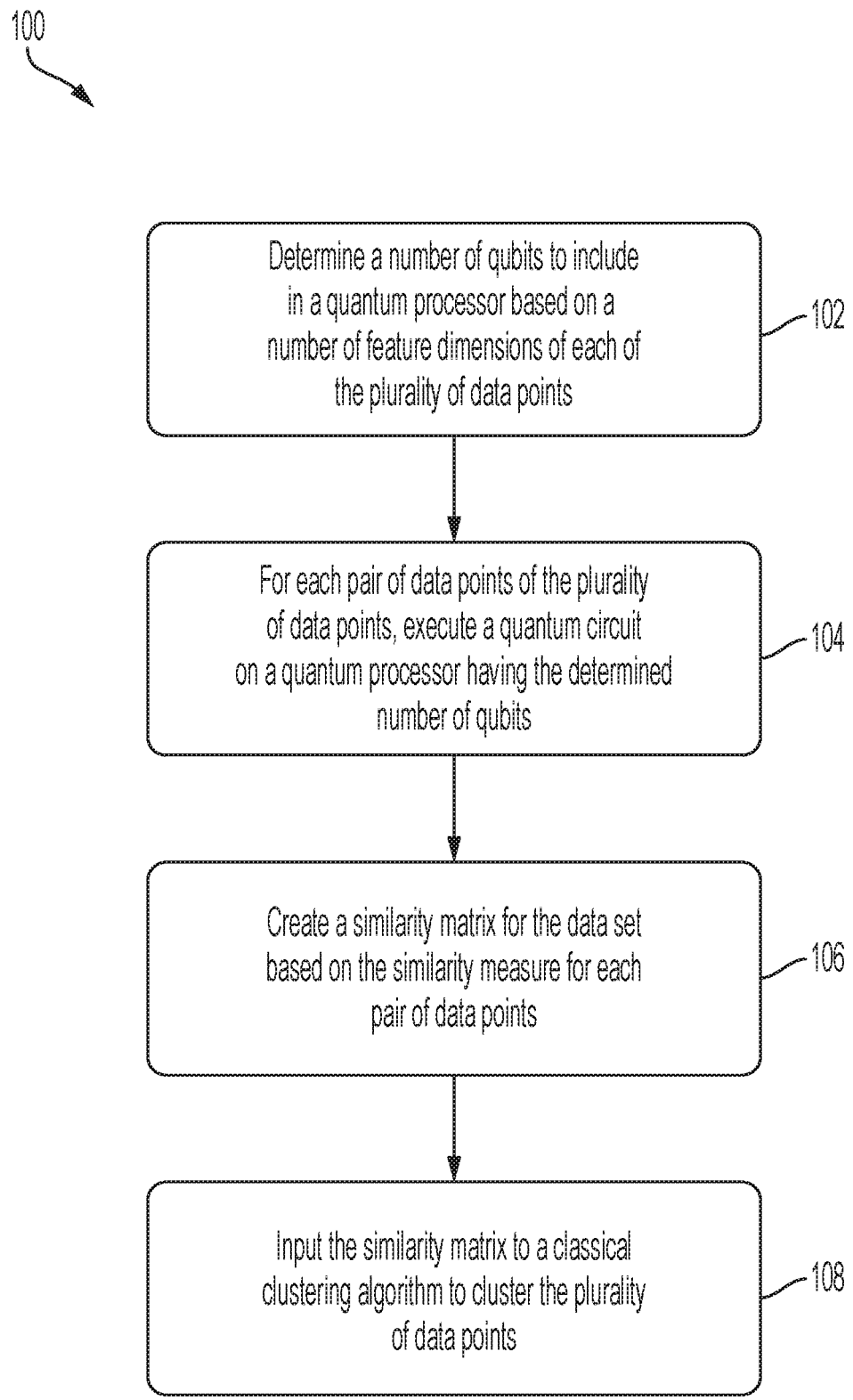
FIG. 1 is a flowchart that illustrates a method 100 of performing unsupervised clustering of a plurality of data points according to an embodiment of the present invention.

Clustering is the task of grouping a set of objects in such a way that objects in the same cluster are more similar to each other than to those in other clusters. Unsupervised clustering is unsupervised learning that categorizes samples from a high-dimensional distribution into a discrete number of clusters, without requiring training data to do so. Clustering algorithms operate on a notion of distance between samples. In the simplest case, the dot product is used.

Common massive-scale examples include grouping ligands when searching for biological therapies or categorizing cells by RNA sequencing or protein presences. Clustering is also used in marketing to identify groups of customers with particular preferences, allowing companies to target specific customers for specific product advertisements.

Spectral clustering algorithms are clustering algorithms that make use of the eigenvalues of a provided similarity matrix of the data to allow clustering in a feature space which follows a more natural dimensionality of the data. The performance of the spectral clustering algorithm depends on how well the provided similarity matrix encapsulates the distance between data points. For example, if two clusters are separated radially in three dimensions, an algorithm using a three dimensional radial distance measure to calculate the similarity matrix will outperform a one dimensional linear distance measure. In addition to spectral clustering, there are other clustering algorithms that use a provided similarity matrix to determine clusters. Examples of these include DBSCAN and agglomerative hierarchical clustering.

In the biological and chemical cases mentioned above, as well as many others, the ligands in question are more naturally described by their high-dimensional quantum characterization and their quantum distance to one another. This distance is inaccessible to a classical computer, because it requires the calculation of a wavefunction exponential in the size of the molecule, and values of the ground truth classical data are likely too chaotic and nonlinear for distance measurements to be meaningful. This is the heart of the difficulty of these fields. Therefore, if we want to accurately cluster these systems to be able to analyze or isolate important groups, we must use a quantum computer to produce the relationships between data points. The method and system described herein use a quantum kernel to represent the distance between two samples in Hilbert space.

Even for non-biological data, using a quantum distance can give us access to feature spaces inaccessible to a classical computer, extending the range of available clustering avenues exponentially (though it is unknown for which types of data this will provide an improvement). In the near term, we will only have access to noisy intermediate-scale quantum (NISQ) systems, and therefore must be very selective about how we design our quantum methods when we use these devices to maximize the opportunity for quantum advantage. Methods using shorter circuits in hybrid quantum-classical systems are the most promising frontier.

FIG. 1 is a flowchart that illustrates a method 100 of performing unsupervised clustering of a plurality of data points according to an embodiment of the present invention. The method 100 includes determining a number of qubits to include in a quantum processor based on a number of feature dimensions of each of the plurality of data points 102. The method 100 further includes, for each pair of data points of the plurality of data points, executing a quantum circuit on the quantum processor having the determined number of qubits 104. The quantum circuit includes a feature map template circuit parameterized with a first plurality of rotations. The first plurality of rotations are based on feature values of a first data point of the pair of data points. The quantum circuit also includes a backward feature map template circuit parameterized with a second plurality of rotations. The second plurality of rotations are based on feature values of a second data point of the pair of data points. The quantum circuit also includes a measurement circuit that outputs a similarity measure for the pair of data points. The method 100 includes creating a similarity matrix for the data set based on the similarity measure for each pair of data points 106. The method 100 includes inputting the similarity matrix to a classical clustering algorithm to cluster the plurality of data points 108. The feature map template circuit and the backward feature map template circuit each use quantum properties of superposition and entanglement of the qubits of the quantum processor.

The feature values of a data point with n feature dimensions may be represented by (feature value_1, feature value_2, . . . , feature value_n). For example, a data point with two feature dimensions may have a value (0.1, 0.2), where 0.1 is the feature value for the first feature, and 0.2 is the value for the second feature. It is assumed herein that each data point in the plurality of data points has the same number of feature dimensions.

According to an embodiment of the present invention, one qubit is included in the quantum processor for each feature dimension. However, the embodiments of the invention are not limited to a single qubit per features. The number of qubits in the quantum processor could be greater than or less than the number of features.

According to an embodiment of the present invention, the feature map template circuit includes a plurality of entangling two-qubit quantum gates. For example, the feature map template circuit may include a plurality of CNOT gates.

Figure 2:
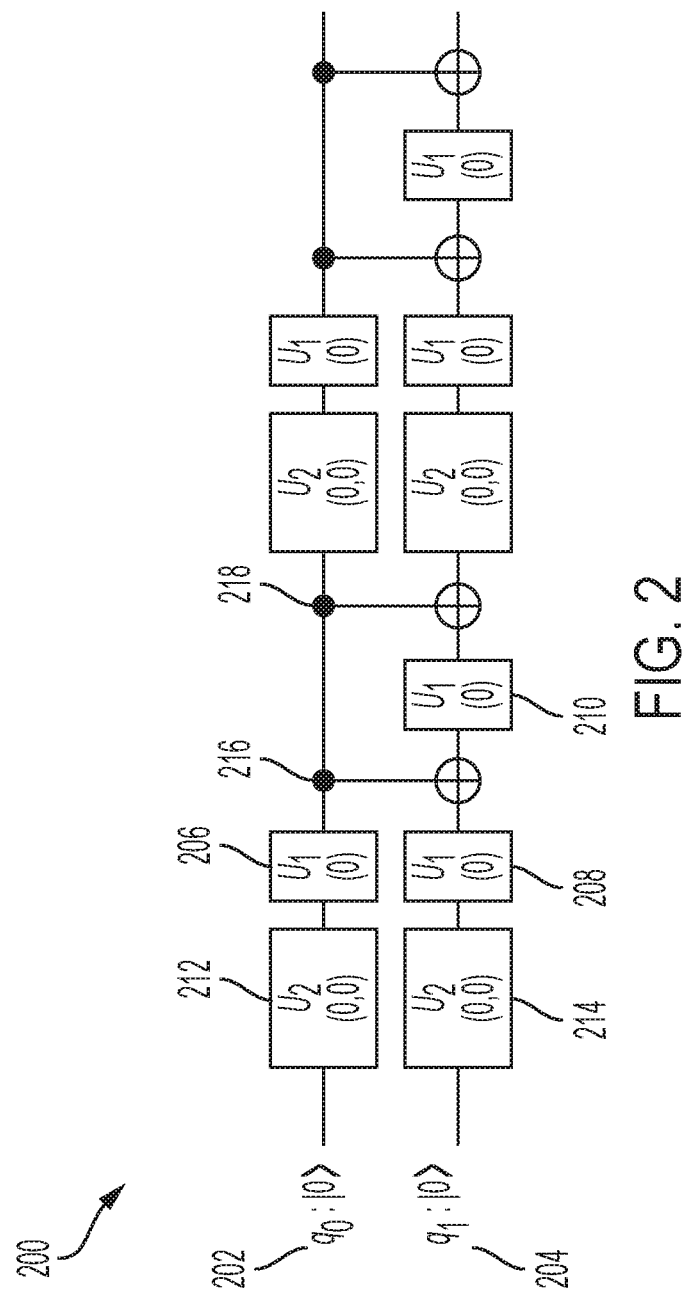
FIG. 2 is a schematic illustration of an example of a feature map template circuit according to an embodiment of the present invention.

FIG. 2 is a schematic illustration of an example of a feature map template circuit 200 according to an embodiment of the present invention. The feature map template circuit 200 operates on two qubits, $q_0$ 202 and $q_1$ 204. The qubits $q_0$ 202 and $q_1$ 204 may be data qubits, and may each be implemented using a plurality of physical qubits. The qubits $q_0$ 202 and $q_1$ 204 may be initialized in the ground state $|0\rangle$, for example, as shown in FIG. 2. The feature map template circuit 200 includes a plurality of single- and two-qubit gates. The gates may take one or more arguments. For example, the $U_1$ gates 206, 208, 210 in FIG. 2 may be single argument gates, while the $U_2$ gates 212, 214 in FIG. 2 may be two argument gates. Higher argument gates may also be included in the feature map template circuit.

The gates may be, for example, rotation operators. The rotations may be parameterized based on one or more feature values of a data point. For example, the argument of the $U_1$ gate 206 in FIG. 2 may depend on a first feature value of the data point. The argument of the $U_1$ gate 208 in FIG. 2 may depend on a second feature value of the data point. The argument of the $U_1$ gate 210 in FIG. 2 may depend on both the first feature value and the second feature value of the data point. For example, the argument may depend on a product of the first feature value and the second feature value.

The feature map template circuit 200 may include entangling two-qubit quantum gates, for example, CNOT gates 216, 218. The feature map template circuit 200 may include a series of gates that are repeated. For example, gates 206-218 may be repeated, as shown in FIG. 2. The number of times that the series of gates is repeated in the feature map template may depend on the complexity of the feature map. For a highly complex feature map, the series of gates may be repeated 10, 20, 50, or more times.

The feature map template circuit 200 is meant to be a non-limiting example. Alternative types, combinations, and numbers of gates may be included in the feature map template. Further, the gates may be included in a different order than that shown in FIG. 2. The feature map template circuit may act on more than two qubits. For example, for data points having n feature dimensions, the feature map template circuit may act on n qubits.

The feature map template circuit may be combined with a backward feature map template circuit and a measurement circuit to form a quantum circuit. The backward feature map template circuit according to an embodiment of the invention includes a series of gates that "undo" the rotations of the gates of the feature map template circuit. The rotations of the backward feature map template circuit may be parameterized by the feature values of a second data point. Thus, by performing a first series of rotations based on the feature values of the first data point, and then performing a second series of "undoing" rotations based on the feature values of the second data point, a quantum analog to a distance between the two data points can be obtained. This quantum distance can be used to construct a similarity matrix.

Figure 3:
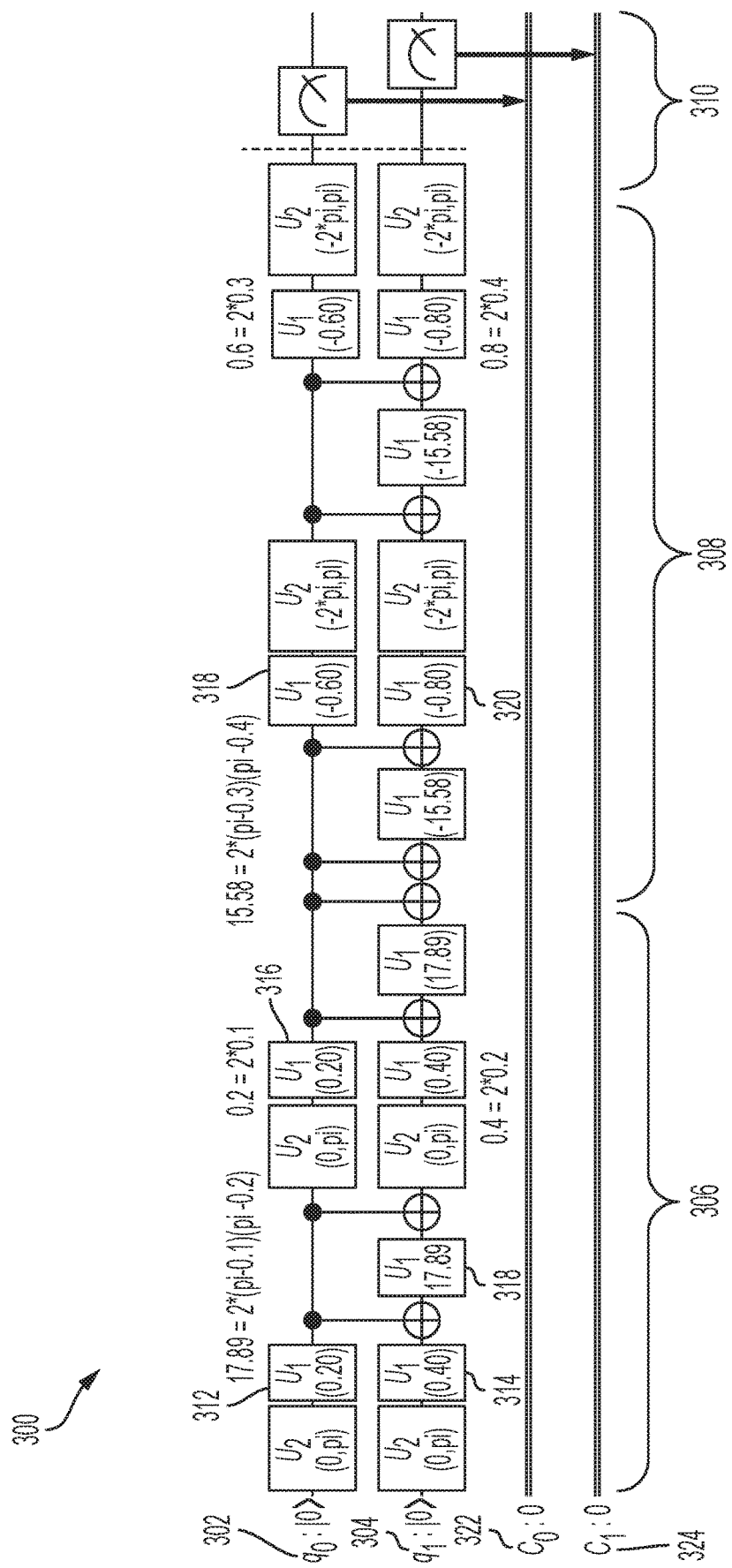
FIG. 3 is a schematic illustration of an example of a quantum circuit according to an embodiment of the present invention.

FIG. 3 is a schematic illustration of an example of a quantum circuit 300 according to an embodiment of the present invention. The quantum circuit 300 is used to provide a similarity measure for a pair of two-dimensional data points whose feature values can be represented as (0.1, 0.2) and (0.3, 0.4). For a data set that includes more than two data points, the quantum circuit is implemented for each pair of data points.

The quantum circuit 300 acts on a quantum processor having two qubits, $q_0$ 302 and $q_1$ 304. The quantum circuit 300 includes a feature map template circuit 306, a backward feature map template circuit 308, and a measurement circuit 310. The feature map template circuit 306 includes gates that are parameterized based on the feature values of the first data point, (0.1, 0.2).

According to an embodiment of the present invention, the feature map template circuit 306 includes, for each feature dimension, a rotation parameterized based on a feature value of a first data point of the pair of data points for the feature dimension. For example, in FIG. 3, the feature map template circuit 306 includes a $U_1$ gate 312 that is parameterized based on the first feature value, 0.1, of the first data point. In the example illustrated in FIG. 3, the first feature value is multiplied by 2, and the $U_1$ gate 312 is parameterized based on the product, 2*0.1=0.2. The feature map template circuit 314 also includes a $U_1$ gate 308 that is parameterized based on the second feature value, 0.2, of the first data point. In the example illustrated in FIG. 3, the second feature value is multiplied by 2, and the $U_1$ gate 314 is parameterized based on the product, 2*0.2=0.4.

According to an embodiment of the present invention, the feature map template circuit 306 includes, for each feature dimension, a plurality of rotations parameterized based on a feature value of a first data point of the plurality of data points for the feature dimension. For example, in FIG. 3, the feature map template circuit 306 includes a first $U_1$ gate 312 parameterized based on the first feature value, 0.1, of the first data point, and a second $U_1$ gate 316 parameterized based on the first feature value, 0.1, of the first data point. As described above, the feature map template circuit may include a series of operations that is repeated two or more times.

According to an embodiment of the present invention, the feature map template circuit 306 includes, for a first data point of the pair of data points, a rotation parameterized based on a plurality of feature values of the first data point. For example, the feature map template circuit 306 includes a $U_1$ gate 318 that is parameterized based on the first feature value, 0.1, and the second feature value, 0.2, of the first data point. As shown in FIG. 3, the $U_1$ gate 318 is parameterized based on 17.89, which is calculated based on the first and second feature values: $17.89=2*(\pi-0.1)(\pi-0.2)$. This number is provided as a non-limiting example of how a rotation may be parameterized based on a plurality of feature values of a data point.

The backward feature map template circuit 308 includes gates that are parameterized based on the feature values of the second data point, (0.3, 0.4). According to an embodiment of the present invention, the backward feature map template circuit 308 includes, for each feature dimension, at least one rotation parameterized based on a feature value of a second data point of the pair of data points for the feature dimension. For example, the backward feature map template circuit 308 includes a $U_1$ gate 318 that is parameterized based on the first feature value, 0.3, of the second data point. The backward feature map template circuit 308 also includes a $U_1$ gate 320 that is parameterized based on the second feature value, 0.4, of the second data point.

The backward feature map template circuit 308 is followed by a measurement circuit 310. The measurement circuit outputs a measurement value for each qubit included in the quantum processor. The measurement for each qubit may be read out to a corresponding classical bit. For example in FIG. 3, the measurement for qubit $q_0$ 302 may be read out to classical bit $c_0$ 322, and the measurement for qubit $q_1$ 304 may be read out to classical bit $c_1$ 324. Each of the corresponding classical bits is combined to provide the similarity measure. For example, a two bit number c1c0 can be read as the value of the similarity measure (eg. 11=3). For two data points i and j, the similarity measure can be used as the $i,j^{th}$ element of the similarity matrix. The similarity measure may be directly input into the similarity matrix, or may be used to determine the number to be input into the similarity matrix. For example, the number may be found by multiplying, dividing, or taking an inverse of the similarity measure. The number may be found by inputting the similarity measure into a function that outputs the number to be used in the similarity matrix.

Figure 4:
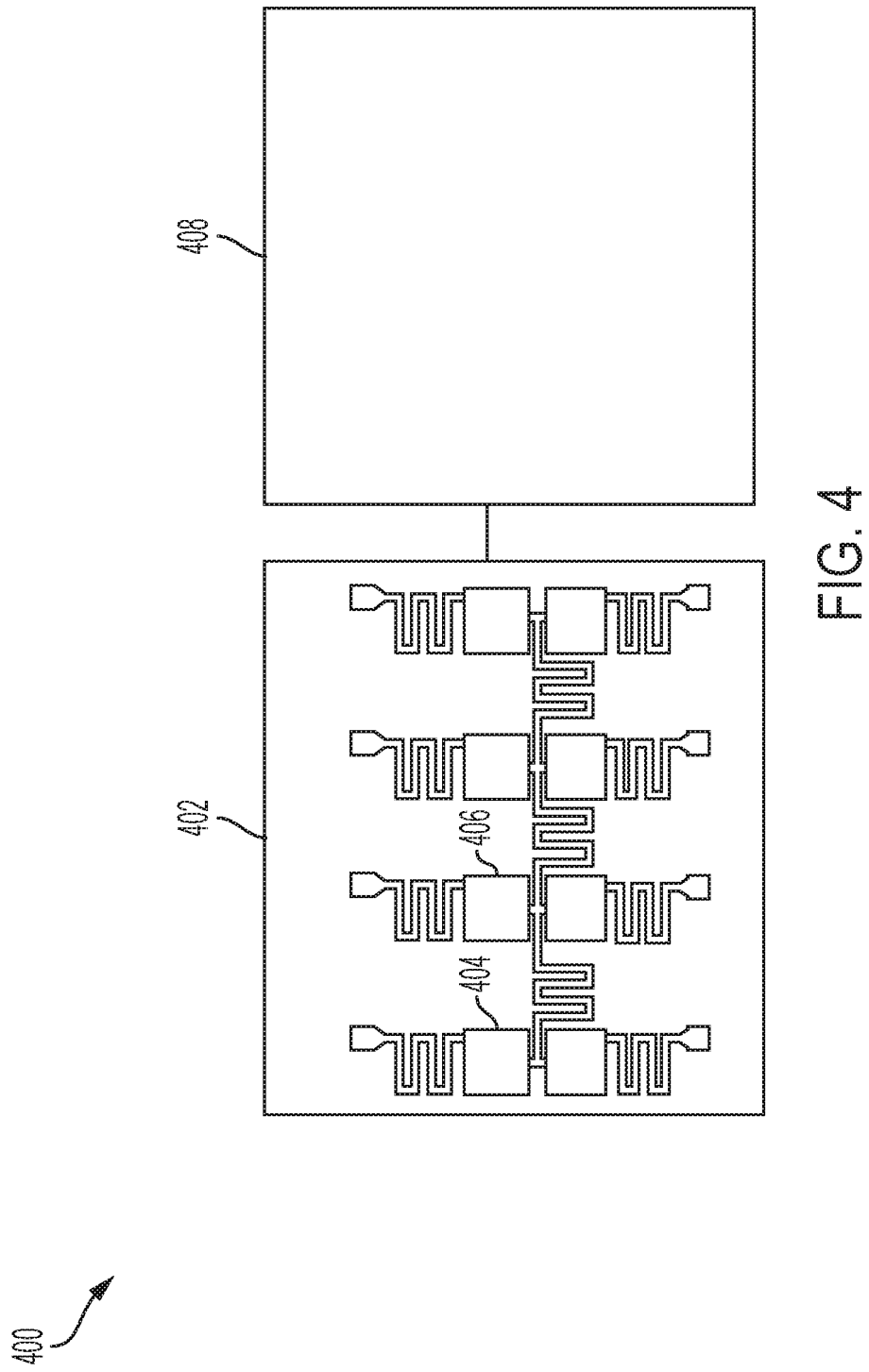
FIG. 4 is a schematic illustration of a hybrid quantum-classical system according to an embodiment of the present invention.

FIG. 4 is a schematic illustration of a hybrid quantum-classical system 400 according to an embodiment of the present invention. The system 400 includes a quantum processor 402. The quantum processor 402 has a number of qubits 404, 406 corresponding to a number feature dimensions of each data point of plurality of data points to be clustered. The quantum processor 402 is configured to, for each pair of data points of the plurality of data points, execute a quantum circuit. The quantum circuit includes a feature map template circuit parameterized with a first plurality of rotations, wherein the first plurality of rotations are based on feature values of a first data point of the pair of data points. The quantum circuit includes a backward feature map template circuit parameterized with a second plurality of rotations, wherein the second plurality of rotations are based on feature values of a second data point of the pair of data points. The quantum circuit includes a measurement circuit that outputs a similarity measure for the pair of data points. The feature map template circuit and the backward feature map template circuit each use quantum properties of superposition and entanglement of the qubits of the quantum processor. The feature map template circuit, backward feature map template circuit, and measurement circuit of the quantum processor 402 may have the attributes described above with reference to FIGS. 1-3.

The hybrid quantum-classical system 400 includes a classical processor 408 in communication with the quantum processor 402. The classical processor is configured to receive the similarity measure for each pair of the plurality of data points, and create a similarity matrix for the plurality of data points based on the similarity measure for each pair of data points. The classical processor 408 is further configured to execute a classical clustering algorithm on the similarity matrix to cluster the plurality of data points.

According to an embodiment of the present invention, the classical processor 408 is further configured to assign each data point of the plurality of data points to a cluster, and output, for each data point of the plurality of data points, in indication of the cluster.

The classical processor 408 can be a dedicated "hard-wired" device, or it can be a programmable device. For example, it can be, but is not limited to, a personal computer, a work station, or any other suitable electronic device for the particular application. In some embodiments, it can be integrated into a unit or it can be attachable, remote, and/or distributed.

According to an embodiment of the present invention, a hybrid quantum-classical system uses a quantum device to calculate the similarity matrix of some data, and then inputs the similarity matrix into a classical spectral clustering algorithm. The system may perform better on data points that can be separated using a quantum feature map compared to an algorithm using a similarity matrix calculated on a classical computer. In particular, the system employs a quantum feature map that makes use of the quantum properties of superposition and entanglement. Achieving the same dimensionality in the feature space on a classical computer would require exponential time (unless the polynomial hierarchy collapses).

We incorporate a similarity matrix calculated using a quantum device into a spectral clustering algorithm as follows. Starting with the dataset to be clustered, we use the number of feature dimensions to determine the number of qubits to be used in the calculation of the similarity matrix.

According to an embodiment of the present invention, the number of qubits is equal to the number of feature dimensions. After determining number of qubits to be used, we calculate the similarity matrix using a quantum circuit that acts on the determined number of qubits. We make sure to select a quantum circuit that includes a feature map template circuit that uses the quantum properties of superposition and entanglement. The feature map template circuit is specially designed to be exponentially hard to simulate classically.

For each pair of data points, we create and run the quantum circuit to measure the distance between the two data points. The quantum circuit includes one feature map template circuit that is parameterized with rotations equal to the feature values of the first data point. The quantum circuit also includes a backward feature map template circuit that is parameterized with rotations equal to the feature values of the second data point. The quantum circuit includes a measurement circuit that outputs a similarity measure for the pair of data points. The measurement circuit may measure each qubit of the determined number of qubits. The values of the qubits may be read onto classical bits that indicate a similarity measure for the pair of data points. We use the similarity measure for each pair of data points to create a similarity matrix. We input the similarity matrix into a classical clustering algorithm to calculate the clusters in the provided dataset. According to an embodiment of the present invention, the classical clustering algorithm is a spectral clustering algorithm. However, the embodiments of the invention are not limited to spectral clustering algorithms. Other types of clustering algorithms may be used, for example, k-means clustering and density clustering. Further, the quantum circuit may be constructed based on the specific classical clustering algorithm to be used.

We have implemented and tested this system using a data set for which cluster identifications were known, and therefore the accuracy of the system could be verified. The system was able to identify the two clusters with 100% accuracy, while spectral clustering with classically calculated similarity matrices was completely unable to cluster the data. FIG. 5 shows simulated results 500 and experimental results 502 for one data set, with results for three different measures of clustering: (1) fowlkes_mallows, (2) mutual information, and (3) rand_index. The three different measures of clustering were three different methods of evaluating how well the clustering algorithms performed. For the actual results 502, the quantum circuit was implemented in quantum hardware.

For each data set, a simulation using a hybrid quantum-classical algorithm was performed for a quantum circuit in combination with one of three classical algorithms: "agglomerative," "dbscan," and "spectral." A value of 1.0 indicates that each of the data points was accurately clustered, while a value below 1.0 indicates inaccurate clustering. As shown in FIG. 5, the value for each simulated hybrid quantum-classical algorithm was 1.0, indicating 100% accuracy.

For each data set, a simulation using a purely classical algorithm was performed for each of four classical algorithms: "linear," "poly," "rbf," and "sigmoid." As shown in FIG. 5, the purely classical algorithms had much lower accuracy than the hybrid systems.

The experimental results 502 for the three different measures each have values equal to or very close to 1, indicating high accuracy even when implemented in physical hardware. The results in FIG. 5 highlight the ability of the method and system disclosed herein to accurately cluster data sets that are highly problematic for classical computers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of performing unsupervised clustering of a plurality of data points, comprising:
   determining a number of qubits to include in a quantum processor based on a number of feature dimensions of each of said plurality of data points;
   for each pair of data points of said plurality of data points, executing a quantum circuit on a quantum processor having said determined number of qubits, wherein said quantum circuit comprises:
     a feature map template circuit parameterized with a first plurality of rotations, wherein said first plurality of rotations are based on feature values of a first data point of said pair of data points;
     a backward feature map template circuit parameterized with a second plurality of rotations, wherein said second plurality of rotations are based on feature values of a second data point of said pair of data points; and
     a measurement circuit that outputs a similarity measure for said pair of data points;
   creating a similarity matrix for said plurality of data points based on said similarity measure for each pair of data points; and
   inputting said similarity matrix to a classical clustering algorithm to cluster said plurality of data points,
   wherein said feature map template circuit and said backward feature map template circuit each use quantum properties of superposition and entanglement of said qubits of said quantum processor.

2. The method according to claim 1, wherein determining a number of qubits to include in said quantum processor based on a number of feature dimensions of each of said plurality of data points comprises including one qubit in said quantum processor for each feature dimension.

3. The method according to claim 1, wherein said feature map template circuit includes a plurality of entangling two-qubit quantum gates.

4. The method according to claim 1, wherein said feature map template circuit comprises, for each feature dimension, a rotation parameterized based on a feature value of a first data point of said pair of data points for said feature dimension.

5. The method according to claim 1, wherein said feature map template circuit comprises, for each feature dimension, a plurality of rotations parameterized based on a feature value of a first data point of the plurality of data points for said feature dimension.

6. The method according to claim 1, wherein said feature map template circuit comprises, for a first data point of the pair of data points, a rotation parameterized based on a plurality of feature values of said first data point.

7. The method according to claim 1, wherein said backward feature map template circuit comprises, for each feature dimension, at least one rotation parameterized based on a feature value of a second data point of said pair of data points for said feature dimension.

8. The method according to claim 1, further comprising constructing said feature map template circuit and said backward feature map template circuit based on said classical clustering algorithm.

9. The method according to claim 1, wherein said classical clustering algorithm is a spectral clustering algorithm.

10. The method according to claim 1, wherein said measurement circuit outputs a measurement value for each qubit included in said quantum processor.

11. The method according to claim 10, wherein said measurement value for each qubit is read out to a corresponding classical bit.

12. The method according to claim 10, wherein each of said corresponding classical bits is combined to provide said similarity measure.

13. A hybrid quantum-classical system, comprising:
a quantum processor, said quantum processor having a number of qubits corresponding to a number of feature dimensions of each data point of a plurality of data points to be clustered, said quantum processor configured to:
for each pair of data points of said plurality of data points, execute a quantum circuit comprising:
a feature map template circuit parameterized with a first plurality of rotations, wherein said first plurality of rotations are based on feature values of a first data point of said pair of data points;
a backward feature map template circuit parameterized with a second plurality of rotations, wherein said second plurality of rotations are based on feature values of a second data point of said pair of data points; and
a measurement circuit that outputs a similarity measure for said pair of data points,
wherein said feature map template circuit and said backward feature map template circuit each use quantum properties of superposition and entanglement of said qubits of said quantum processor; and
a classical processor in communication with said quantum processor, said classical processor configured to:
receive said similarity measure for each pair of said plurality of data points;
create a similarity matrix for said plurality of data points based on said similarity measure for each pair of data points; and
execute a classical clustering algorithm on said similarity matrix to cluster said plurality of data points.

14. The hybrid quantum-classical system according to claim 13, wherein said classical processor is further configured to:
assign each data point of said plurality of data points to a cluster; and
output, for each data point of said plurality of data points, in indication of said cluster.

15. The hybrid quantum-classical system according to claim 13, wherein said feature map template circuit includes a plurality of entangling two-qubit quantum gates.

16. The hybrid quantum-classical system according to claim 13, wherein said feature map template circuit comprises, for each feature dimension, a rotation parameterized based on a feature value of a first data point of said pair of data points for said feature dimension.

17. The hybrid quantum-classical system according to claim 13, wherein said feature map template circuit comprises, for each feature dimension, a plurality of rotations parameterized based on a feature value of a first data point of said pair of data points for said feature dimension.

18. The hybrid quantum-classical system according to claim 13, wherein said feature map template circuit comprises, for a first data point of said pair of data points, a rotation parameterized based on a plurality of feature values of said first data point.

19. The hybrid quantum-classical system according to claim 13, wherein said backward feature map template circuit comprises, for each feature dimension, at least one rotation parameterized based on a feature value of a second data point of said pair of data points for said feature dimension.

20. The hybrid quantum-classical system according to claim 13, further comprising constructing said feature map template circuit and said backward feature map template circuit based on said classical clustering algorithm.

21. The hybrid quantum-classical system according to claim 13, wherein said classical clustering algorithm is a spectral clustering algorithm.

22. The hybrid quantum-classical system according to claim 13, wherein said measurement circuit outputs a measurement value for each qubit included in said quantum processor.

23. The hybrid quantum-classical system according to claim 22, wherein said measurement value for each qubit is read out to a corresponding classical bit in said classical processor.

24. The hybrid quantum-classical system according to claim 23, wherein each of said corresponding classical bits is combined to provide said similarity measure.

* * * * *